Sept. 10, 1940.  E. L. ROSE  2,213,968
POWER TRANSMISSION
Filed Oct. 29, 1936  5 Sheets-Sheet 4

INVENTOR
EDWIN L. ROSE
BY
Ralph L. Tweedale
ATTORNEY

Sept. 10, 1940.         E. L. ROSE         2,213,968
POWER TRANSMISSION
Filed Oct. 29, 1936        5 Sheets-Sheet 5

INVENTOR
EDWIN L. ROSE
BY
Ralph L. Tweedale
ATTORNEY

Patented Sept. 10, 1940

2,213,968

UNITED STATES PATENT OFFICE 2,213,968

POWER TRANSMISSION

Edwin L. Rose, Watertown, Conn., assignor to The Waterbury Tool Company, Waterbury, Conn., a corporation of Connecticut Application October 29, 1936, Serial No. 108,179

13 Claims. (Cl. 60—52)

This invention relates to power transmissions and more particularly to those of the type comprising one or more fluid pressure energy translating devices, one of which may function as a pump and another as a fluid motor, the displacement of one device being variable to alter the drive ratio between the driving member and the driven member. The invention is adapted particularly for use in an electro-hydraulic steering gear for ships and the preferred embodiment is described herein as for this purpose, although it will be understood that many features are adapted for use in power transmissions for other purposes.

Electro-hydraulic steering gears of the type with which the present invention is concerned comprise an electric motor operating a variable displacement pump which is connected to a rudder operating fluid motor. The amount and direction of fluid flow between the pump and the motor is under the control of follow-up mechanism whereby the displacement of the pump is varied in accordance with the relative positions of the ship's steering wheel and the rudder. So long as the rudder position corresponds to the wheel position, the pump displacement is maintained at zero. Whenever the rudder position varies from the steering wheel position or vice versa, the pump displacement is changed to bring the rudder to the position corresponding to that of the wheel. The term "follow-up mechanism" and similar expressions are used hereafter in the specification and claims as referring to that part of the mechanism which receives movements both from the steering wheel and from the rudder and which, by its differential action, controls the displacement of the pump.

A problem which arises in steering gears of this character is the necessity of avoiding overloading of the electric motor due to excessive side pressures exerted on the rudder in opposition to its intended direction of movement such as are caused by the vessel moving astern or yawing of the vessel in heavy seas. This has necessitated the provision of some form of torque compensator to limit the displacement of the pump under excessive rudder side pressures.

It is also desirable in steering gears of this type to provide for starting of the electric motor under no load so that a high starting torque electric motor is not necessary. As heretofore constructed steering gears of this class have comprised a plurality of separate and independent mechanisms for meeting the problems enumerated and which have been associated with the steering gear as attachments thereto without attempt to combine all the necessary elements into a single unitary construction. It has also been customary to directly operate the displacement regulating member of the steering gear pump from the follow-up mechanism. The latter, usually of the floating lever or differential gear type, is of heavy and bulky construction due to the force requirements at the displacement regulating member. This in turn necessitates the use of large capacity telemetric connections from the steering wheel to the steering gear in order to provide sufficient torque for operating the follow-up mechanism.

While hydraulic servo-motors have been used for operating large steering gear pumps in order to reduce the torque requirements for the telemetric connections to the follow-up mechanism, these servo-motors have heretofore been of the complicated follow-up type in which the output member of the floating lever or the differential follow-up mechanism is connected to one member of a hydraulic follow-up pilot valve, the servo-motor piston and the pump displacement regulator being connected to the other member of the follow-up pilot valve. This construction leaves much to be desired in the way of sensitivity of control and freedom from self-oscillation or hunting of the entire system as well as being somewhat complicated and expensive to manufacture due to the increased effect of lost motion in either of the two follow-up mechanisms which are placed in series.

It is an object of the present invention, therefore, to provide a novel hydraulic power transmission system of this character wherein the variable displacement pump and all the necessary control mechanism therefor including a follow-up control, an input power limiting control, and an unloading control for starting may be incorporated in a single unit of apparatus of small size, in comparison with previous practice, and in which a reliable, accurate and non-self-oscillating follow-up control is provided which permits the use of low torque telemetric connections between the control unit and the steering wheel.

Further objects and advantages of the present invention will be apparent from the following description, reference being had to the accompanying drawings wherein a preferred form of the present invention is clearly shown.

Figure 1:
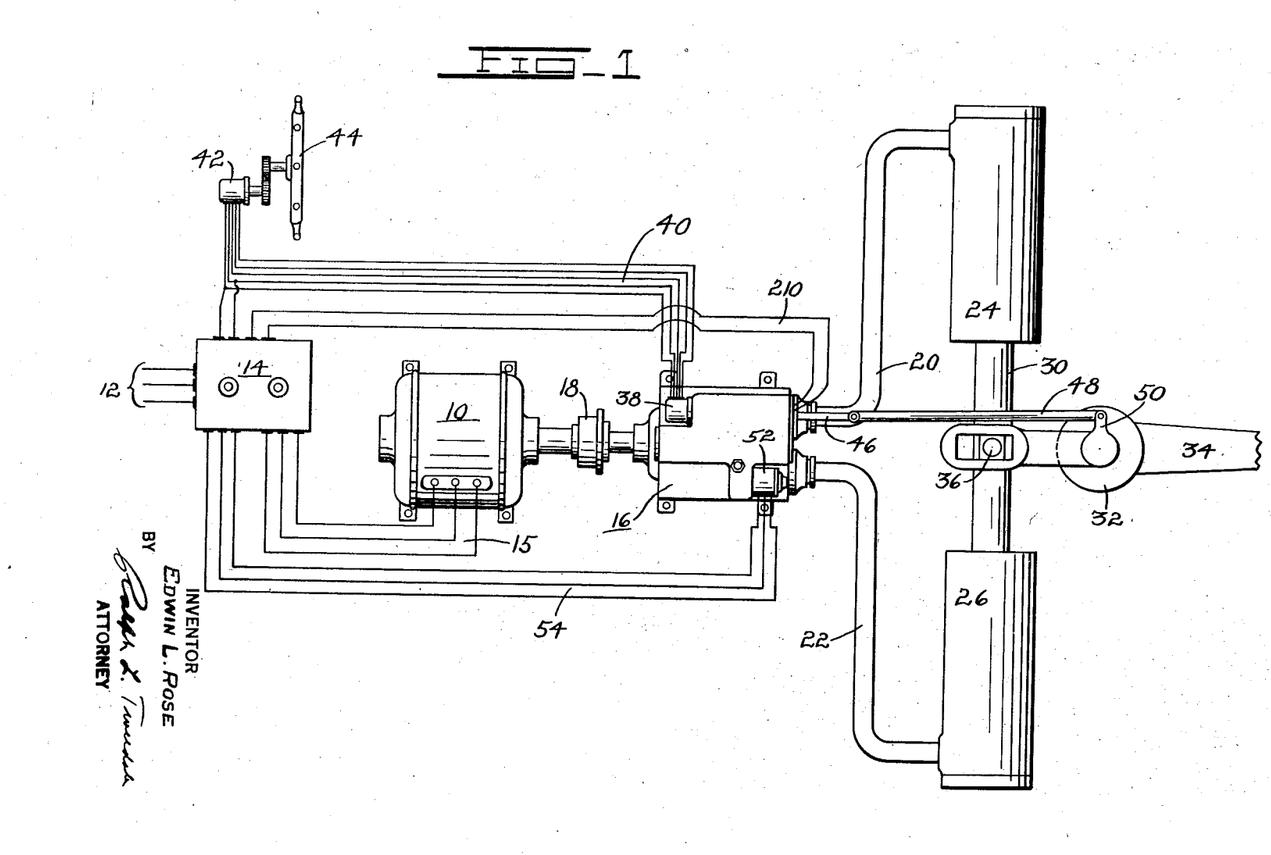
Fig. 1 is a diagrammatic plan view of an electro-hydraulic steering gear incorporating a preferred form of the present invention.
Figure 2:
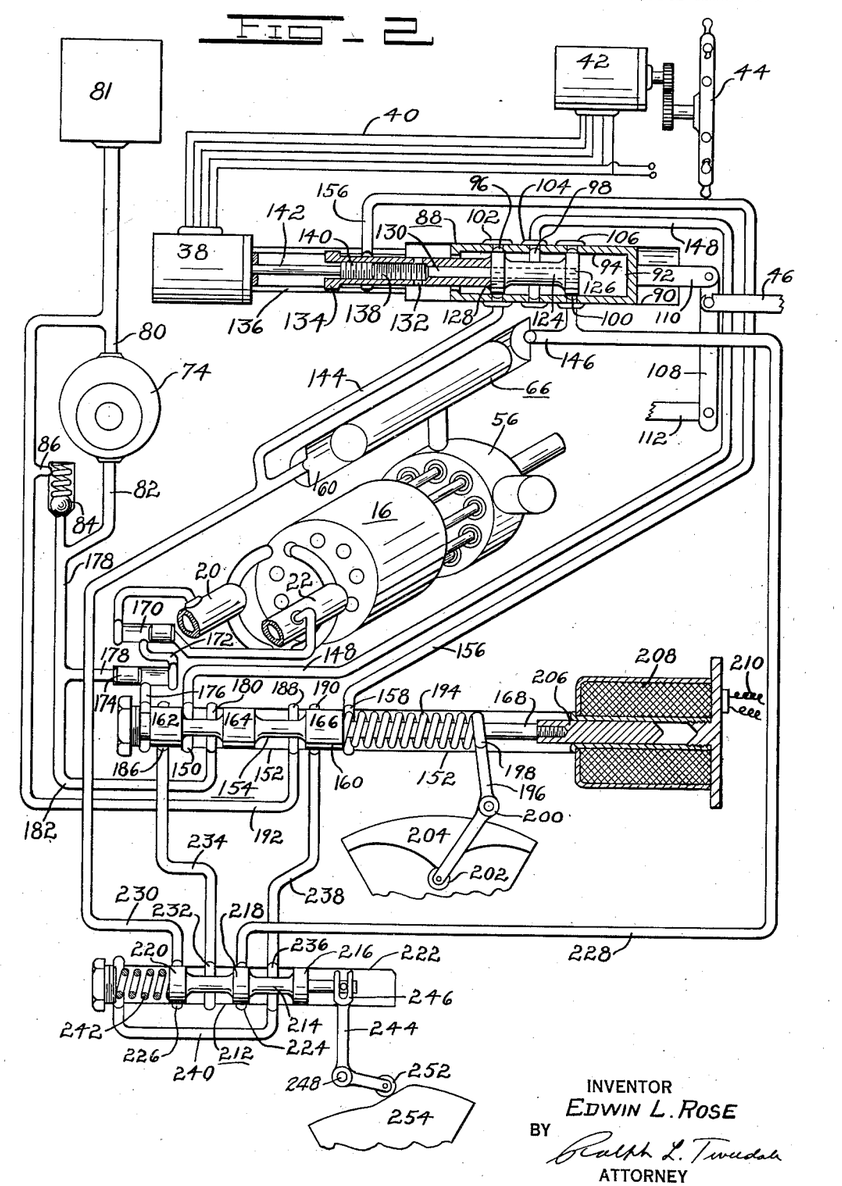
Fig. 2 is a schematic view showing the hydraulic circuits incorporated in the mechanism of Fig. 1.
Figure 3:
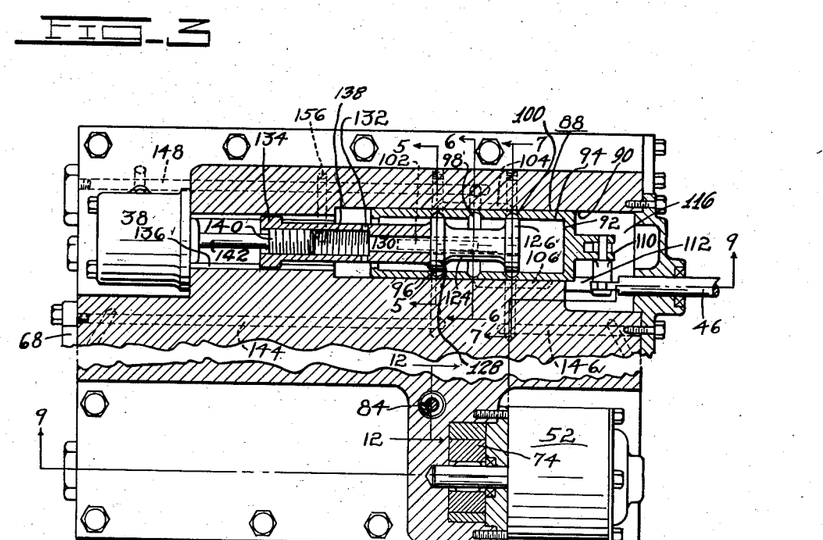
Fig. 3 is a horizontal sectional view through the control mechanism taken on line 3—3 of Fig. 11.
Figure 4:
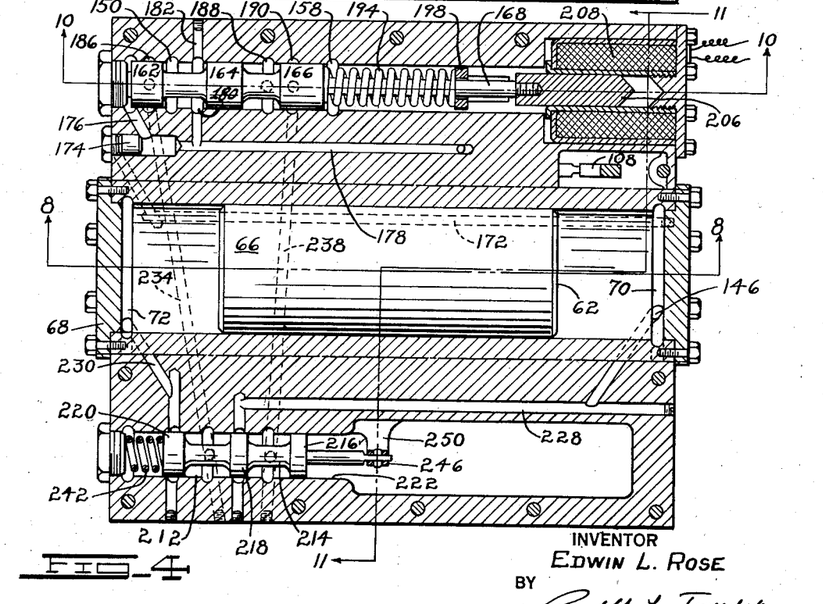
Fig. 4 is a cross section on line 4—4 of Fig. 11.
Figure 5:
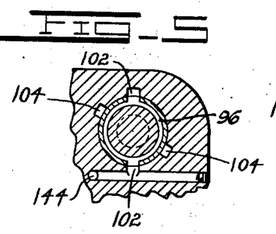
Fig. 5 is a fragmentary cross section on line 5—5 of Fig. 3.
Figure 6:
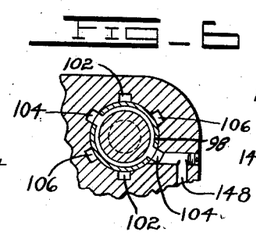
Fig. 6 is a fragmentary cross section on line 6—6 of Fig. 3.
Figure 7:
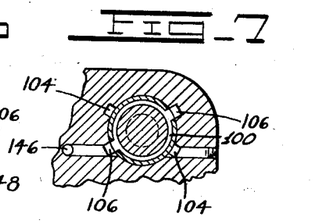
Fig. 7 is a fragmentary cross section on line 7—7 of Fig. 3.
Figure 8:
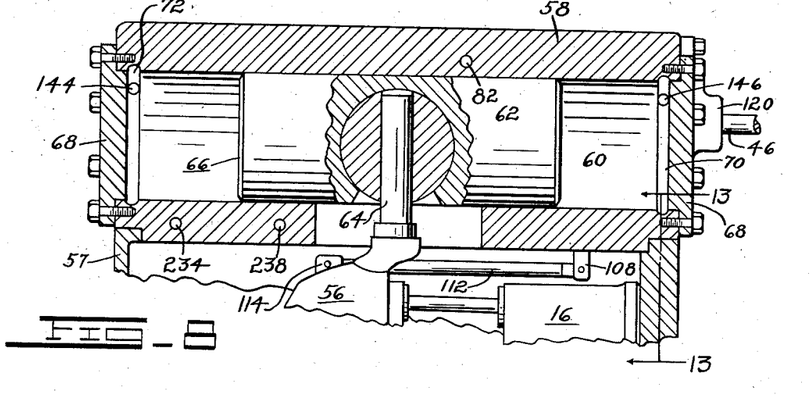
Fig. 8 is a cross section on line 8—8 of Fig. 4.
Figure 9:
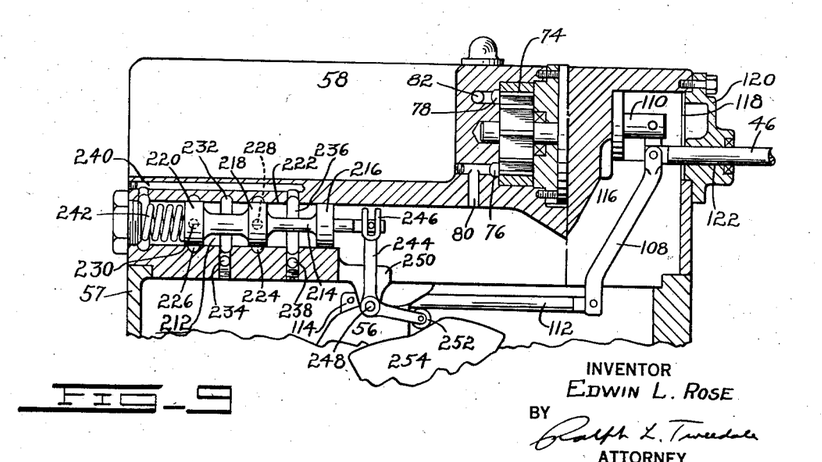
Fig. 9 is a cross section on line 9—9 of Fig. 3.
Figure 10:
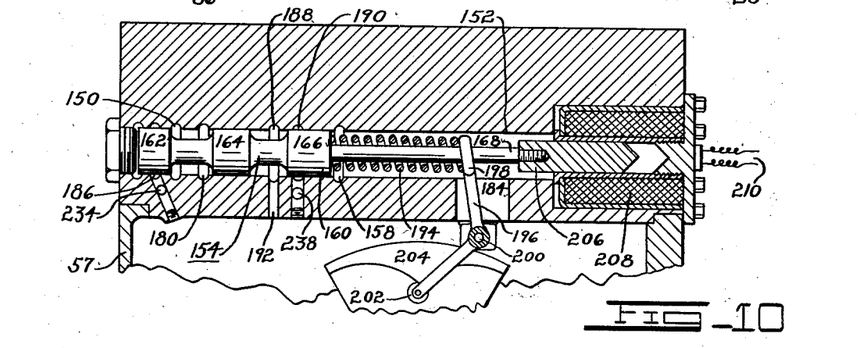
Fig. 10 is a cross section on line 10—10 of Fig. 4.
Figure 11:
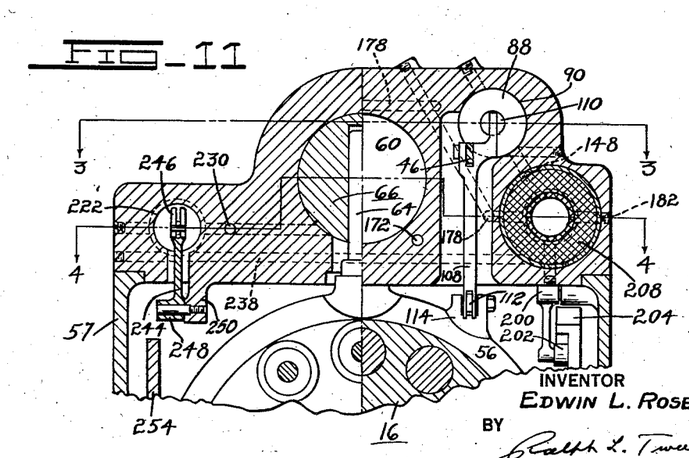
Fig. 11 is a cross section on line 11—11 of Fig. 4.
Figure 12:
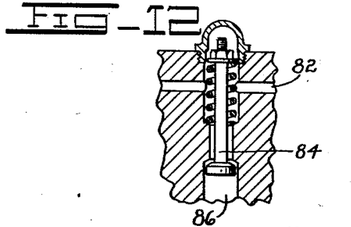
Fig. 12 is a fragmentary cross section on line 12—12 of Fig. 3.
Figure 13:
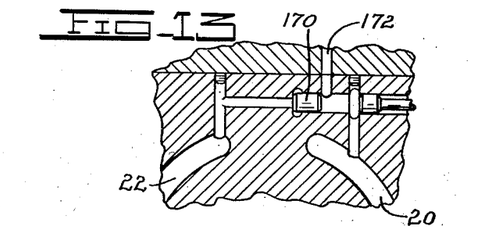
Fig. 13 is a fragmentary cross section on line 13—13 of Fig. 8.

Referring now to Fig. 1 there is illustrated a steering gear comprising an electric motor prime mover 10 which is fed from a supply line 12 through a starting compensator 14 and lines 15. The motor 10 drives a combined variable displacement pump and control unit 16 through a coupling 18. The pump 16 is connected by a pair of conduits 20 and 22 to a pair of hydraulic cylinders 24 and 26 within which is mounted a double acting ram 30 connected to the stock 32 of a rudder 34 by a cross head 36. The control unit incorporated in the pump 16 includes a telemetric receiver preferably a Selsyn motor indicated at 38 which is connected by lines 40 to a Selsyn generator 42 geared to the ship's steering wheel 44. The Selsyn motor 38 thus constitutes a control input element whereby controlling efforts applied to the wheel 44 are put into the control system at the pump 16. A follow-up shaft 46 projects from one end of the control unit and connects by link 48 to an arm 50 on the rudder stock 32. The control unit also includes an auxiliary electric motor 52 connected by lines 54 to the starting compensator 14 which may include separate starting mechanism for the motor 52.

Referring now to Figs. 2 through 13, the variable displacement pump 16 is illustrated as of the well-known "Waterbury" type wherein an oscillatable tilting box 56 may be moved to either side of the neutral position for varying the displacement of the pump and the direction of fluid flow to and from the conduits 20 and 22. The casing 57 of the pump is constructed with an open top which is adapted to be closed by a unitary block 58 which is formed to contain all the necessary mechanism for controlling the movement of the tilting box 56. For this purpose the block 58 is formed with a central, longitudinally extending bore 60 within which is mounted a double acting piston 62 connected to the tilting box 56 by a pivoting and sliding connection 64, thus forming a fluid motor 66 for operating member 56 which controls the pump displacement. The ends of the bores 60 are closed with caps 68 immediately adjacent which the bore 60 is enlarged at 70 and at 72 to provide for fluid connections to the tilting box operating motor 66. Fluid for operating the motor 66 under normal conditions is provided by an auxiliary constant displacement pump 74 which is illustrated as of the "Gerotor" type and which is directly connected to the auxiliary electric motor 52. The pump 74 is provided with a suction port 76 and a delivery port 78. The former communicates by a conduit 80 with the interior of the pump casing 57 which is in communication with an expansion tank 81, while the latter communicates by a conduit 82 with a relief valve 84 (see Fig. 12). The relief valve 84 is adapted to open to the interior of the casing 57 through a conduit 86 whenever the pressure in the conduit 82 exceeds a predetermined value.

The motor 66 is normally under the control of a follow-up valve 88 which is located in a bore 90 of the block 58. The valve 88 is subject to the combined influence of the Selsyn motor 38, the follow-up shaft 46, and the tilting box 56 in such a way that the valve openings for passage of fluid to and from the motor 66 vary in substantial proportion to the difference between the positions of these three members. The valve 88 comprises a sleeve member 92 which fits within the bore 90 and has an interior bore 94 which is formed with three annular grooves 96, 98 and 100. The bore 90 is formed with three pairs of diametrically opposite, longitudinally extending grooves 102, 104 and 106 (see Figs. 5, 6 and 7). Drill holes are provided through the wall of the sleeve 92 to connect the groove 96 with the grooves 102, the groove 98 with the grooves 104, and the groove 100 with the grooves 106. The valve member 92 is subject to the joint influence of the follow-up shaft 46 and the tilting box 56 through a floating lever 108 (see Fig. 9). The latter is connected at its upper end to a bifurcated projection 110 formed on the valve member 92 and is connected at its lower end to a link 112 which in turn is connected to a projection 114 on the tilting box 56. The bore 90 terminates in an enlarged chamber 116 which opens to the interior of the casing 57 and within which the floating lever 108 is free to move. The chamber 116 has an opening 118 at the end face of the block 58 which is closed by a cap 120 having a bearing 122 in which the follow-up shaft 46 is freely slidable.

Within the bore 94 of the valve 92 is freely slidable a valve member 124 having pistons 126 and 128 normally overlapping the grooves 100 and 96. The valve member 124 is provided with an interior bore 130 communicating by holes 132 with the left-hand end of the bore 90. The left-hand end of the member 124 is provided with a splined section 134 cooperating with splines 136 formed in the left-hand end of the bore 90 whereby the member 124 is free to slide longitudinally but is constrained against rotation. The left-hand end of the bore 130 is enlarged and formed with an interior thread at 138 within which is threaded a screw member 140 rigidly secured to the output shaft 142 of the selsyn motor 38. Thus the longitudinal position of the valve 124 is determined by the angular position of the shaft 142 of the Selsyn motor 38. The total stroke of the valve members 92 and 124 either side of midposition is preferably several times the relative movement required between the members 92 and 124 to completely open the grooves 96 and 100. The sensitivity of the valve is thereby increased at all rudder positions since only a comparatively small movement of the valve 124 relative to the valve member 92 is necessary to produce full opening. It will be apparent that the valve 88 as a whole is differentially responsive to the movements or displacements of three different controlling elements; namely, the Selsyn motor 38 controlling one valve member 124, the tilting box 56 acting through floating lever 108, on the other valve element 92 and the rudder 34 also acting through floating lever 108 on the valve element 92. The degree of opening of valve 88 thus depends upon the difference, or the algebraic sum, of the displacements of these three elements from their neutral position.

The grooves 102 in the bore 90 communicate by a conduit 144 with the left-hand end of the bore 60 of motor 66, while the grooves 106 communicate by a conduit 146 with the right-hand end of the bore 60. The grooves 104 communicate by a conduit 148 with a groove 150 formed in a bore 152 of a constant horsepower valve 154. A conduit 156 connects the left-hand end of the bore 90 with a groove 158 formed in the bore 152 of the constant horsepower valve 154.

The constant horsepower valve 154 comprises a piston valve member 160 having piston heads 162, 164 and 166 and a stem 168. The left-hand end of the head 162 is subject to pressure from the main circuit conduits 20 and 22 through a shuttle valve 170 which is adapted to connect a conduit 172 with either the conduit 20 or the conduit 22, whichever happens at any moment to be at the higher pressure. The conduit 172 connects to one end of a second shuttle valve 174 which connects a conduit 176 with either the conduit 172 or with the conduit 82 through a conduit 178 depending upon which is at the higher pressure.

The space between the heads 162 and 164, in the valve position shown, provides communication between the groove 150 and a groove 180 which connects by a branch conduit 182 to the outlet of the auxiliary pump 74 through conduits 178 and 82. The right-hand end of the piston 166 is adjacent the groove 158 so that in the normal position of the valve, as shown, communication is established between groove 158 and the interior of the casing 57 through a clearance passage 184. A groove 186 is formed adjacent the piston 162 so that when the valve is moved to the right, communication will be established therewith from the conduit 176. Grooves 188 and 190 are formed adjacent the piston 166 so that communication will be established therebetween when the valve is moved to the right. The groove 188 communicates with the interior of the casing 57 through a conduit 192.

A spring 194 surrounds the stem 168 and abuts the head 166 to constantly urge the valve into the normal position illustrated. The force exerted by the spring 194 is under the control of a bell crank 196 having a bifurcated end 198 embracing the stem 168. The bell crank 196 is pivoted to the casing 57 at 200 and carries a roller follower 202 which engages a cam 204 which is rigidly secured to the tilting box 56. The shape of the cam 204 is such that at neutral position of the tilting box 56, the spring 194 is compressed to a predetermined maximum value while the pressure is relieved to an increasing extent as the tilting box is moved away from neutral position in either direction. The curvature of the cam 204 is correlated with the efficiency of the power transmission system as a whole so that the valve 154 will move to the right whenever a predetermined horsepower input to the pump 16 is exceeded. The valve 154 is also adapted to be moved to the right during starting of the electric motor 10 and for this purpose the stem 168 carries a core 206 which may be attracted by a solenoid 208. The winding of the solenoid 208 is connected by lines 210 to the starting compensator 14 in such a manner that the solenoid 208 will be energized during the period that motor 10 is connected to the lines 12 for starting but will be deenergized when the motor 10 is connected directly across the lines 12 for running and of course when the motor 10 is stopped.

The block 58 also includes a selector valve 212 for the purpose of controlling the direction of flow of fluid to the motor 66 whenever the constant horsepower valve 154 moves to the right. The valve 212 comprises a valve member 214 having piston heads 216, 218 and 220 slidable in a bore 222. The heads 218 and 220 in neutral position of the tilting box 56 overlap grooves 224 and 226 which are connected by conduits 228 and 230 with the right and left-hand ends, respectively, of the bore 60. Intermediate the heads 218 and 220 is formed a groove 232 which communicates by a conduit 234 with the groove 186 of the constant horsepower valve 154. Between the heads 216 and 218 is formed a groove 236 which communicates by a conduit 238 with the groove 190 of the constant horsepower valve 154. A conduit 240 also connects the groove 236 with the left-hand end of the bore 222.

A spring 242 urges the valve member 214 to the right. The position of the valve 214 is controlled by a bell crank 244 having a bifurcated end 246 engaging the stem of the valve 214. The bell crank 244 is pivoted at 248 to a bracket 250 formed on the block 58 and has a roller follower 252 engaging a cam 254 rigidly secured to the tilting box 56. The cam 254 is shaped to move the valve member 214 from one extreme position to the other as the tilting box moves through a small range from one side of neutral position to the other side. Thus, in Fig. 9, with the tilting box moved slightly clockwise from the neutral position shown, the valve 214 moves to the right opening communication between the grooves 224 and 232 and between groove 226 and the left-hand end of the bore 222. With the tilting box moved slightly counter-clockwise, the valve 214 is moved to the left, opening communication between grooves 224 and 236 and between grooves 226 and 232.

In operation the motors 10 and 52 are started by pushing the starting button of the starting compensator 14 which throws the motor 52 directly across the line and the motor 10 across the line through suitable reactance until the motor 10 comes up to speed. During this period the solenoid 208 is energized, attracting the core 206 and pulling the constant horsepower valve 154 to the right. Should the tilting box happen to lie in some position other than neutral, the opening of the constant horsepower valve 154 causes the tilting box to be immediately returned to neutral by fluid supplied either from the auxiliary pump 74 or from the main pump 16. Assuming the tilting box to lie on the clockwise side of neutral, fluid will be delivered from the pump 74 through the conduits 82 and 178, shuttle valve 174, conduit 176, groove 186, conduit 234, valve 212 and conduit 228 to the right-hand end of the tilting box motor 66. The tilting box is thereby moved counter-clockwise until neutral position is reached, at which time the valve 212 closes. Should the resisting pressure in either of the main lines 20 or 22 become higher than the pressure developed by the pump 74, the shuttle valve 174 will move to the left admitting main circuit pressure instead of the auxiliary pump pressure to the conduit 176. There are thus available two alternative supplies for moving the tilting box to neutral under these conditions and the shuttle valve 174 acts to utilize whichever supply is under the greater pressure.

As soon as the motor 10 comes up to running speed the starting compensator 14 throws the motor directly on to the lines 12 for normal running and deenergizes the solenoid 208. The system is then ready for normal steering operation in which the rudder 34 is made to follow movements imparted to the steering wheel 44. It will be seen that with the parts in the neutral position as illustrated, movement imparted to the wheel 44 is transmitted by the Selsyn telemotor system 38—42 to the movable follow-up valve member 124 by means of the threaded member 140 and the splined connection at 134—136.

Assuming the direction of wheel movement to be such that the member 124 is moved to the left, the groove 96 is opened to communicate with the groove 98 while the groove 100 is opened to communicate with the right-hand end of the bore 94; and, through the holes 130 and 132, with the conduit 156. Fluid from the auxiliary pump 74 is thereby delivered through conduits 82, 178 and 182, grooves 180 and 150, conduit 148, grooves 104 and 98, grooves 96 and 102, and conduit 144 to the left-hand end of the tilting box motor 66. Fluid is discharged from the right-hand end of the bore 60 through conduit 146, grooves 106 and 100, passages 130 and 132, conduit 156, and groove 158 to the interior of the casing 57. The tilting box is thereby moved clockwise at a rate determined by the opening in the follow-up valve 88. Fluid is thus delivered through conduit 20 to the cylinder 24 and is withdrawn from cylinder 26 through conduit 22. The rudder is thus given a movement counter-clockwise which actuates the follow-up shaft 46 moving it to the left and carrying with it the movable sleeve 92 of the follow-up valve 88. As soon as the sleeve 92 takes up a position corresponding to the new position of the valve member 124 fluid flow is cut off from the tilting box motor 66.

Inasmuch as the fluid motor 66 moves at a rate substantially in proportion to the opening of the follow-up valve 88, and since the position of the motor 66 determines the velocity of the rudder, it will be seen that the valve 88 controls the acceleration of the rudder 34. In order to avoid self-oscillation characteristics in the follow-up control system, the floating lever 108 is interposed between the follow-up shaft 46 and the sleeve 92 of the follow-up valve 88. The movements transmitted from the follow-up shaft 46 to the sleeve 92 are thereby modified in accordance with the position of the tilting box 56 so that as soon as the follow-up valve 88 is opened by operation of the steering wheel 44, the resulting movement of the tilting box 56 tends to close the follow-up valve even before the rudder 34 starts to move.

This operation may be understood more clearly if the three factors which determine the amount of opening of the follow-up valve 88, be considered as acting separately, one after the other, although in actual operation the three factors are always acting substantially simultaneously. The effect of the Selsyn motor 38 moving member 124 to the left has been previously explained as causing the valve to open to admit fluid to the left end of motor 66. Assuming, for convenience, that the member 124 has been moved instantaneously to the left a distance equal to the thickness of piston head 126 it will be seen that the valve 88 is thus opened wide. Accordingly the tilting box 56 moves clockwise at maximum speed.

Clockwise movement of tilting box 56 acts through link 112 and floating lever 108 (assume follow-up shaft 46 is stationary for the moment) to move sleeve 92 to the left thus tending to close valve 88. If the leverage between tilting box 56 and sleeve 92 is such that the sleeve moves a distance equal to the thickness of piston head 126 while the tilting box moves from neutral to full stroke (other leverage ratios may be used depending on the degree of stability, or absence of self-oscillation desired) then, if follow-up shaft 46 is stationary, by the time tilting box 56 reaches full stroke, the valve 88 is again closed and further movement of the motor 66 is stopped. The pump 16 is thus in full stroke, delivering fluid through pipe 20 and the rudder moves at full speed counter-clockwise. Movement of the rudder is transmitted by follow-up shaft 46 to the sleeve 92 moving the latter further to the left and opening valve 88 in the opposite direction to admit fluid to the right-hand end of motor 66. The tilting box 56 is thus caused to move counter-clockwise toward neutral position. If it be imagined that rudder 34 could jump instantaneously from its original position to its final position, corresponding to the position of valve member 124 after it was moved by Selsyn motor 38; such rudder movement would have moved sleeve 92 sufficiently to just fully open valve 88 in the direction admitting fluid to the right-hand end of motor 66. With the follow-up shaft 46 stationary, then, in its new position, the return movement of tilting box 56 to neutral position, acts through floating lever 108 to move sleeve 92 to the right a distance equal to the thickness of piston head 126 so that as the tilting box reaches neutral valve 88 is just closing. Thus the rudder has been moved to a new position corresponding to the new position of the steering wheel 44 and as long as the steering wheel is held stationary there is no further movement of any parts of the control system.

Inasmuch as the angular displacement of the tilting box from neutral position is substantially proportional to the velocity of the rudder 34, it will be seen that the initial opening of the valve (by movement of member 124) which produces a proportional acceleration of the rudder 34 is compensated by movements of the sleeve 92 proportional both to the velocity of the rudder and to the position thereof. This feature of feeding in a velocity component to the follow-up connection provides a control system which is free from self-oscillating characteristics. In other words, the system as a whole may reach a stabilized condition after a movement has been imparted to the steering wheel 44 without causing overtravel of the rudder 34 which would otherwise occur if the velocity component were not utilized. The action of the follow-up control mechanism is the same for opposite movements of the steering wheel 44 except that connections are established between the conduits 146 and 148 and between the conduits 144 and 156 to move the tilting box away from neutral in a counter-clockwise direction. It will be noted that during normal operation under the control of follow-up valve 88, the tilting box motor 66 is supplied with fluid pressure from the auxiliary pump 74 only, so that the rate of travel of the tilting box is constant with any given opening at the valve 88.

The above described operation is that which takes place normally when the ship is being steered and while there is no excessive resistance to turning of the rudder or to maintaining it stationary in a given position.

Should an excessive resisting torque at the rudder be encountered due to the ship moving astern or due to yawing movements in heavy seas which resistance is sufficient to impose an overload on the motor 10, the constant horsepower valve 154 moves to the right under the pressure transmitted from either conduit 20 or 22 through the shuttle valve 170, conduit 172, shuttle valve 174 and conduit 176 to the left-hand end of the piston head 162. The pressure at which valve 154 opens is determined by the cam 204 so that for very small pump displacements a high pressure is required, while for progressively larger displacements, progressively lower pressures are required. When the valve 154 moves to the right, the follow-up control valve 88 is cut off by the piston 162 closing groove 150 and by the piston 154 closing groove 158. Concurrently connection is established from conduit 176 to groove 186 and through conduit 234 to the selector valve 212. A return connection is also established from the selector valve 212 through conduit 238, grooves 190 and 188 to conduit 192. The tilting box is thereby caused to move toward neutral in the same manner previously described in connection with the operation when the solenoid 208 is energized. During this operation the actuating fluid is always supplied from the main circuit since the lowest pressure required to move valve 154 to the right is many times the pressure at which relief valve 84 opens.

It will be seen that the present control system is formed as a small unitary section of the steering gear pump 16 and the pump and control device may be assembled completely before installation aboard ship, thus greatly simplifying the construction and installation of the steering gear as a whole as well as taking up less space than previous equivalent steering gear systems have required. The entire follow-up and safety control system being made a part of the steering gear pump also simplifies the maintenance of the steering gear since all the parts of the mechanism are within the pump casing and lubricated by the oil which is maintained therein.

All the parts located in the block 58 may be assembled therein before the block is assembled to the pump, the end caps for the various bores being left open. The bell crank 244 is carried on the block 58 and is automatically brought into proper engagement with the cam 254 by the positioning of the block 58 on the casing 57. The bell crank 196 may be mounted on its pivot on the casing 57 before the block 58 is assembled thereto and by leaving the piston of the constant horsepower valve 154 extending somewhat outside the left-hand end of the bore the bifurcated end 198 may be easily engaged astride the stem 168. The floating lever 108 may be connected to the link 112 and the latter connected to the lug 114 before the block 58 is attached to the casing 57, the lever 108 being connected to the projection 110 after the block 58 is secured to the casing 57. Thereafter the end cap 120 with the follow-up shaft 46 projecting therethrough may be attached, the shaft 46 having an upwardly opening, slotted or hooked end in which the pivot pin on the lever 108 may be readily engaged.

While the form of embodiment of the invention as herein disclosed, constitutes a preferred form, it is to be understood that other forms might be adopted, all coming within the scope of the claims which follow.

What is claimed is as follows:

1. In a hydraulic power transmission system the combination with a load device and a fluid motor for actuating the same of a variable displacement pump hydraulically connected to said motor and having a casing and a unitary block attached to said casing, a control input element mounted on said block, means for varying the displacement of the pump in accordance with the differential positions of the control input element and the load device, and means in the block for decreasing the pump displacement, only upon the imposition of a predetermined power load on said pump.

2. In a hydraulic power transmission system the combination with a load device and a fluid motor for actuating the same of a variable displacement pump hydraulically connected to said motor and having a casing and a unitary block attached to said casing, a control input element mounted on said block, means for varying the displacement of the pump in accordance with the differential positions of the control input element and the load device, and means in the block for decreasing the pump displacement, only upon the imposition of a predetermined load on said pump, and operative during starting of the pump to maintain the pump displacement at zero.

3. In a hydraulic power transmission system the combination with a load device and a fluid motor for actuating the same of a variable displacement pump hydraulically connected to said motor, an electric motor for driving the pump, means normally controlling the pump displacement, means for decreasing the pump displacement upon the imposition of a predetermined load on the pump, and means operative during the starting period of the electric motor for rendering the last named means effective to decrease the pump displacement regardless of the power load on the pump.

4. In a hydraulic power transmission system the combination with a load device and a fluid motor for actuating the same of a variable displacement pump hydraulically connected to said motor, an electric motor for driving the pump, means normally controlling the pump displacement, and electrically controlled means for adjusting the pump displacement to zero during the starting period of the electric motor, irrespective of the operation of the normal control means, if the pump displacement is not at zero before starting.

5. In a hydraulic power transmission system the combination with a load device and a fluid motor for actuating the same of a variable displacement pump hydraulically connected to said motor, means movable to vary the pump displacement, a second fluid motor for operating said means, a valve movable to control the rate and direction of movement of the second motor, a control input element movable in accordance with desired movements of the load device, and means for operating said valve differentially in accordance with the displacements of the controlling element, the load device and the displacement varying means.

6. In a hydraulic power transmission system the combination with a load device and a fluid motor for actuating the same to various positions of a pump hydraulically connected to said motor, a control input element movable in accordance with desired movements of the load device, a control device operable to control the rate of delivery of fluid from the pump to the motor to proportionally control the acceleration of the load device, and means for controlling operation of the control device in accordance with the position of the control input element, the position of the load device and the velocity of the load device.

7. In a hydraulic power transmission system the combination with a load device and a fluid motor for actuating the same to various positions of a variable displacement pump hydraulically connected to said motor, a control input element movable in accordance with desired movements of the load device, and means for varying the pump displacement at a rate governed in accordance with the position of the control input element, the position of the load device and the velocity of the load device.

8. In a hydraulic power transmission system the combination with a load device and a fluid motor for actuating the same of a variable displacement pump hydraulically connected to said motor, a control input element movable in accordance with desired movements of the load device, follow-up control means for varying the pump displacement at a rate corresponding to the differential relative positions of the control input element and the load device and connections for modifying the action of the follow-up control means by an amount corresponding to the velocity of the load device.

9. In a hydraulic power transmission system the combination with a load device and a fluid motor for actuating the same of a variable displacement pump hydraulically connected to said motor, a control input element movable in accordance with desired movements of the load device, a member movable to vary the pump displacement, follow-up control means for varying the pump displacement at a rate corresponding to the differential relative positions of the control input element and the load device and connections between said member and the follow-up control means for modifying the action of the follow-up control means by an amount corresponding to the velocity of the load device.

10. In an electro-hydraulic steering gear for operating the rudder of a ship the combination with a fluid motor for operating the rudder and an electric motor prime mover of a unitary pumping and controlling mechanism comprising a variable displacement pump hydraulically connected to said motor and having a displacement varying member, a control input element movable in accordance with desired movements of the rudder, a follow-up mechanism for operating said displacement varying member in accordance with the differential relative positions of the control input element and the rudder, power limiting mechanism for maintaining the power load on the pump below a predetermined value and unloading mechanism for adjusting the pump to zero displacement during starting of the electric motor, irrespective of operation of the follow-up mechanism, if the pump displacement is not at zero before starting.

11. In an electro-hydraulic steering gear for operating the rudder of a ship the combination with a fluid motor for operating the rudder and an electric motor prime mover of a unitary pumping and controlling mechanism comprising a variable displacement pump hydraulically connected to said motor and having a displacement varying member, a control input element movable in accordance with desired movements of the rudder, a fluid motor for operating said member, a follow-up valve for controlling the second named fluid motor in accordance with the differential relative positions of the control input element and the rudder, an auxiliary pump for supplying fluid to operate the second fluid motor, power limiting mechanism for maintaining the power load on the pump below a predetermined value, unloading mechanism for adjusting the pump to zero displacement during starting of the electric motor, irrespective of operation of the follow-up valve, if the pump displacement is not at zero before starting and means for utilizing either the auxiliary pump or the variable displacement pump as a source of fluid for said unloading mechanism.

12. In an electro-hydraulic steering gear for operating the rudder of a ship the combination with a fluid motor for operating the rudder and an electric motor prime mover of a unitary pumping and controlling mechanism comprising a variable displacement pump hydraulically connected to said motor and having a displacement varying member, a control input element movable in accordance with desired movements of the rudder, a follow-up mechanism for operating said displacement varying member in accordance with the differential relative positions of the control input element and the rudder, and unloading mechanism for adjusting the pump to zero displacement during starting of the electric motor, irrespective of operation of the follow-up valve, if the pump displacement is not at zero before starting.

13. In an electro-hydraulic steering gear for operating the rudder of a ship the combination with a fluid motor for operating the rudder and an electric motor prime mover of a unitary pumping and controlling mechanism comprising a variable displacement pump hydraulically connected to said motor and having a displacement varying member, a control input element movable in accordance with desired movements of the rudder, a follow-up mechanism for operating said displacement varying member in accordance with the differential relative positions of the control input element and the rudder, and power limiting mechanism for reducing the pump displacement only when a predetermined power load on the pump is exceeded.

EDWIN L. ROSE.